US012769452B2

(12) United States Patent
Izzi et al.

(10) Patent No.: US 12,769,452 B2
(45) Date of Patent: Oct. 20, 2026

(54) OUT-OF-ORDER PER-ZONE COMMAND HANDLING FOR ZONED MEMORY

(71) Applicant: Micron Technology, Inc., Boise, ID (US)

(72) Inventors: Roberto Izzi, Caserta (IT); Luca Porzio, Casalnuovo (IT); Christian M. Gyllenskog, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/216,330

(22) Filed: May 22, 2025

(65) Prior Publication Data

US 2025/0370625 A1 Dec. 4, 2025

Related U.S. Application Data

(60) Provisional application No. 63/655,997, filed on Jun. 4, 2024.

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
None
See application file for complete search history.

(56) References Cited

U.S. PATENT DOCUMENTS

2014/0258639 A1* 9/2014 Recupero ............ G06F 12/0862 711/136
2014/0359629 A1* 12/2014 Ronen .................. G06F 9/4881 718/102

* cited by examiner

*Primary Examiner* — Khoa D Doan
(74) *Attorney, Agent, or Firm* — Holland & Hart LLP

(57) ABSTRACT

Methods, systems, and devices for out-of-order per-zone command handling for zoned memory are described. Commands for one or more zones of multiple zones of a memory space may be loaded into a queue. Based on loading the commands, an execution of a first command of first commands received for a first zone may be delayed based on an address of the first command being different than a current reference address of a pointer for the first zone. Based on delaying the first command, a subsequent command of the first commands may be executed based on being loaded into the queue within a threshold duration of the first command and an address of the second command matching the current reference address of the pointer. Based on executing the second command, the first command may be executed based on the first address matching the current reference address of the pointer.

25 Claims, 6 Drawing Sheets

OUT-OF-ORDER PER-ZONE COMMAND HANDLING FOR ZONED MEMORY

CROSS REFERENCE

The present application for patent claims priority to U.S. Patent Application No. 63/655,997 by Izzi et al., entitled "OUT-OF-ORDER PER-ZONE COMMAND HANDLING FOR ZONED MEMORY," filed Jun. 4, 2024, which is assigned to the assignee hereof, and which is expressly incorporated by reference in its entirety herein.

TECHNICAL FIELD

The following relates to one or more systems for memory, including out-of-order per-zone command handling for zoned memory.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
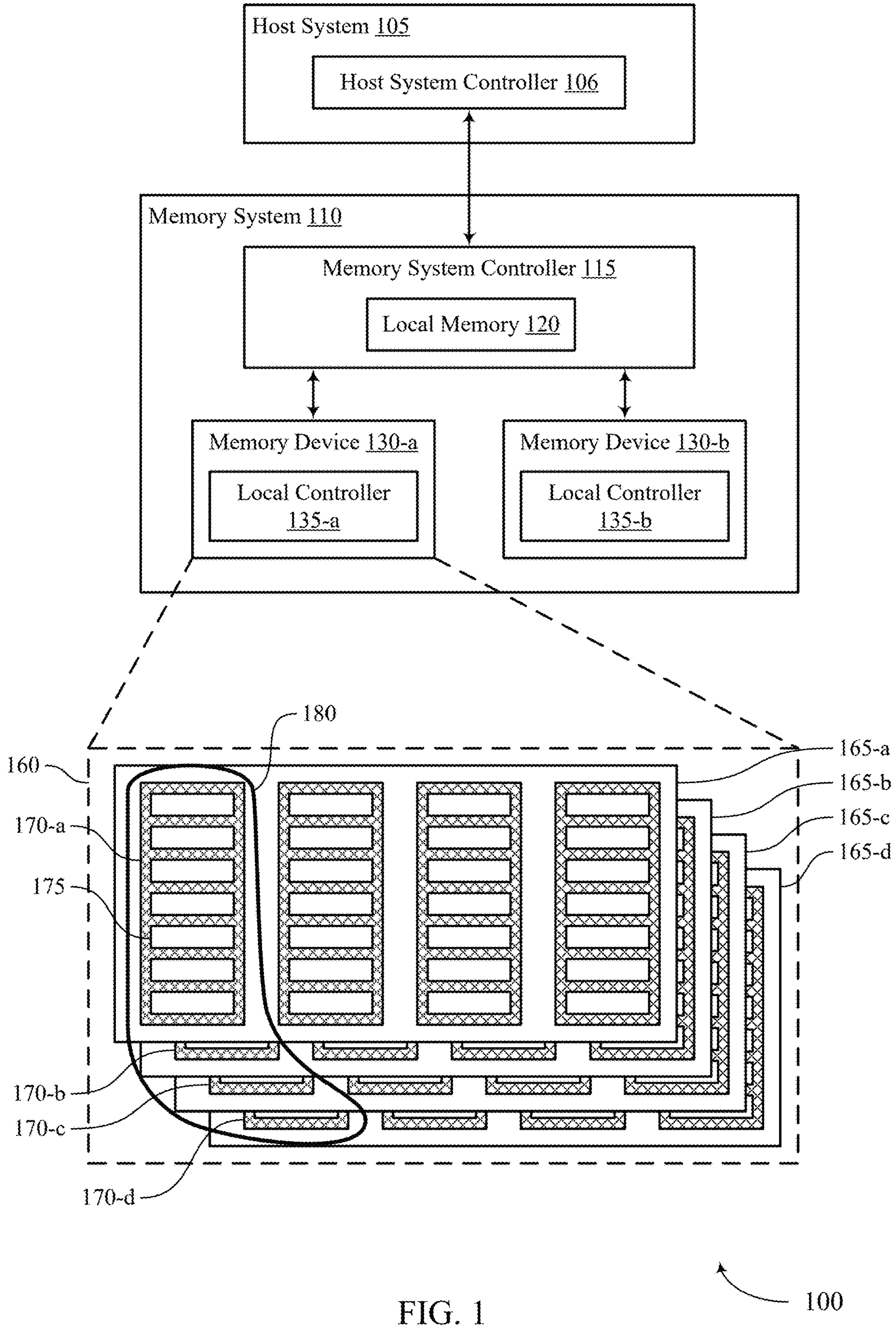
FIG. 1 shows an example of a system that supports out-of-order per-zone command handling for zoned memory in accordance with examples as disclosed herein.

A memory system may include a "zoned" memory space (e.g., a logical unit) that is configured to have multiple zones. During some operational traffic patterns, such as intensive traffic patterns (e.g., benchmark testing), "out-of-order" commands may be obtained (e.g., issued to, received at) at a memory system such that logical block addresses of adjacent commands are non-sequential. The memory system may be configured to immediately reject out-of-order commands. In some examples, the additional latency added by the memory system rejecting out-of-order commands and the host system resending rejected commands, however, may excessively reduce the performance of a zoned memory space. In some examples, to avoid the added latency caused by receiving out-of-order commands, a host system may be configured to maintain a single command per zone in a command queue of the memory system.

Though providing improved performance relative to certain scenarios, limiting a host system to one command per zone in the command queue may relatively reduce performance relative to implementations that allow more than one command per zone to be loaded into the command queue (e.g., so long as out-of-order errors do not occur). Thus, techniques (e.g., methods, systems, apparatuses, techniques, configurations, components) that support loading multiple commands per zone into the command queue and improved management of the reception of out-of-order commands may be desired.

To support loading multiple commands per zone into the command queue and improved management of the reception of out-of-order commands, a host system may be permitted to include more than one command per zone in a command queue and out-of-order commands that are received for a zone may be temporarily held (e.g., for a threshold duration) while the host system continues to load the command queue with one or more additional commands (e.g., including the in-order command). If the in-order commands are received within the threshold duration, the in-order commands and the out-of-order commands may then be executed sequentially without any check condition statuses being sent to the host system.

In addition to applicability in memory systems as described herein, techniques for handling out-of-order commands received for a zone of a zoned memory may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by allowing multiple commands to be received per zone of memory while supporting improved techniques for handling out-of-order commands that are received for a zone of memory, which may increase a throughput for accessing the zones of the memory and improve a user experience for applications using the zoned memory, among other benefits.

FIG. 1 shows an example of a system 100 that supports out-of-order per-zone command handling for zoned memory in accordance with examples as disclosed herein. The system 100 includes a host system 105 coupled with a memory system 110. The system 100 may be included in a computing device such as a desktop computer, a laptop computer, a network server, a mobile device, a vehicle, an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random-access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on the same die, within the same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in the same page 175 may share (e.g., be coupled with) a common word line, and memory cells in the same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated, which may be due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support out-of-order per-zone command handling for zoned memory. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The system 100 may include any quantity of non-transitory computer readable media that support out-of-order per-zone command handling for zoned memory. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some examples, the memory system 110 (e.g., via the memory system controller 115) may load, into a queue, commands for one or more zones of multiple zones of a memory space. Based on loading the commands into the queue, the memory system 110 (e.g., via the memory system controller 115) may delay an execution of a first command of first commands received for a first zone based on a first address of the first command being different than a current reference address of a pointer for the first zone. Based on delaying the execution of the first command, the memory system 110 (e.g., via the memory system controller 115) may execute a subsequently received, second command of the first commands based on the second command being loaded into the queue within a threshold duration of delaying the execution of the first command and on a second address of the second command matching the current reference address of the pointer. Based on executing the second command, the memory system 110 (e.g., via the memory system controller 115) may execute the first command based on the first address matching the current reference address of the pointer.

Figure 2:
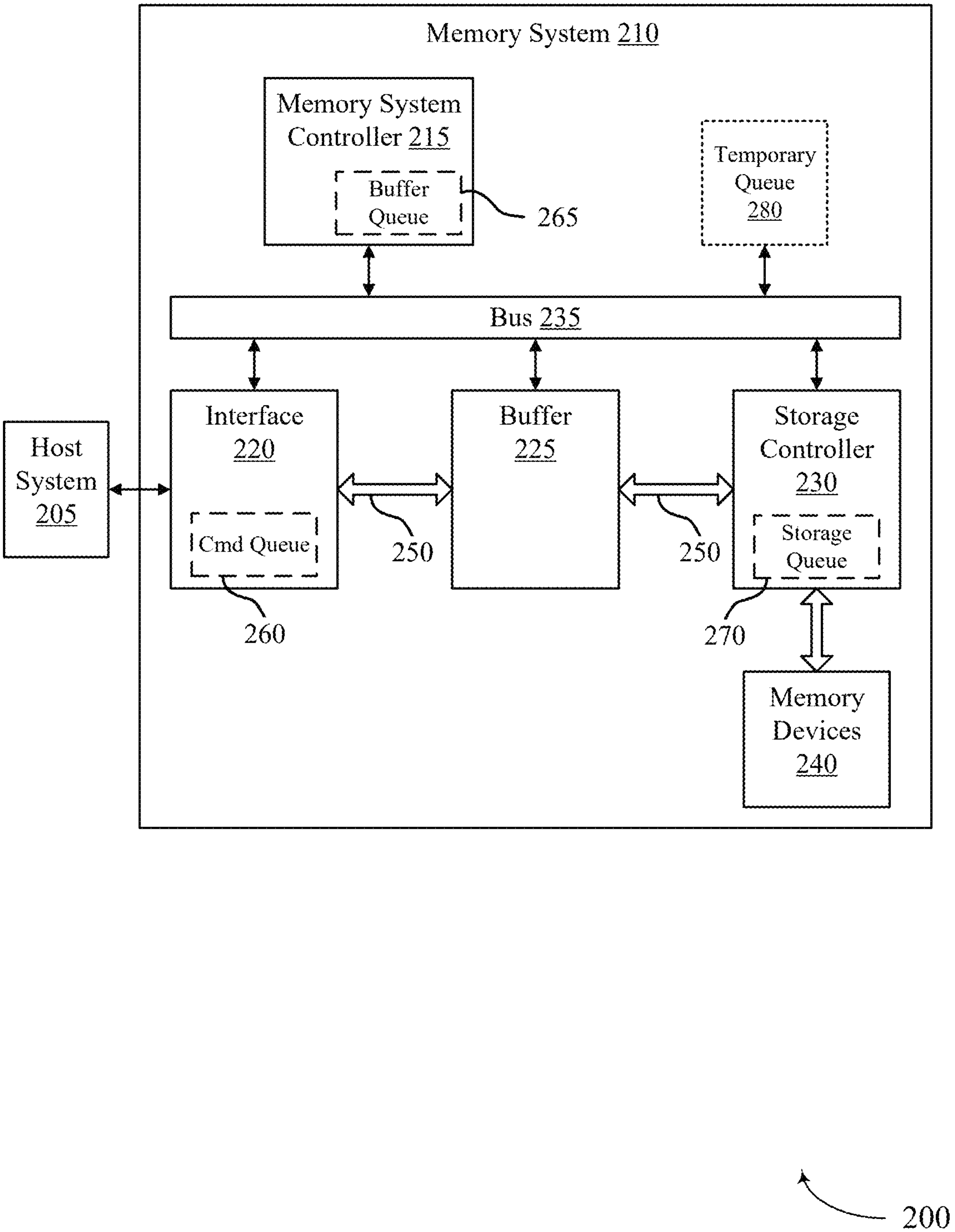
FIG. 2 shows an example of a system that supports out-of-order per-zone command handling for zoned memory in accordance with examples as disclosed herein.

FIG. 2 shows an example of a system 200 that supports out-of-order per-zone command handling for zoned memory in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

After the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

The memory (e.g., having a capacity of 1 TB) supported by a memory system may be composed of memory regions (which may also be referred to as volumes). In some examples, the memory regions may be further partitioned into memory sub-regions (which may also be referred to as partitions). In some cases, both memory regions and memory sub-regions may be referred to generally as memory spaces.

In some examples, memory regions may be implemented as logical units (LUs) identifiable using logical unit numbers (LUNs). In some examples, a logical unit may be referenced by, or as, its LUN. In some examples, a logical unit may be a logical disk. The logical units may have different sizes and may be used to store different types of data. For example, a first logical unit (having a first LUN) may be designated as a code execution unit and used to store executable code for an operating system and/or applications installed for a host system, and a second logical unit (having a second LUN) may be designated as a mass storage unit and used to store user-level data.

In some examples, of multiple logical units at a memory system, the memory system may include one or more "zoned" logical units that are partitioned into zones (e.g., 2 zones, 4 zones, 6 zones), where each zone of a zoned logical unit may include a continuous range of logical blocks in the zoned logical unit. In such cases, each zone may be limited to being written sequentially. Thus, a size of an L2P table for zoned logical units may be reduced and read performance may be improved. Also, since multiple zones may be accessed in parallel ("opened"), accesses across zones may be random while accesses within zones may remain sequential. Thus, a zoned logical unit may support both random and sequential accesses. In some examples, a zoned logical unit may be accessed with higher bandwidth and lower latency and may reduce write amplification at the zoned logical unit (a scenario where the amount of information physically written at the memory system is a multiple of the logical amount intended to be written).

In some examples, a memory system may include a command queue. In some examples, the command queue may be managed (e.g., primarily) by and transparent to a host system. In some examples, the command queue includes sub-queues for each zone of a zoned logical unit. To ensure that the zones in a zoned logical unit are accessed (e.g., read or written) sequentially, the memory system may include respective pointers that keep track of the first free address (e.g., LBA) in the zones, where a valid command (e.g., read command or write command) for a zone has a starting address that matches the first free address. If a command received for a zoned logical unit has a starting address that is different than the first free address, then the memory system may reject the command and send (e.g., to a host system, or bounce back component), in response to the command, a check condition status.

During intensive traffic patterns (e.g., benchmark testing), commands received from a host device may be issued to and/or received for a zoned logical unit in a different order than intended (e.g., the commands may be issued to the zoned logical unit out-of-order). For example, the commands may be issued to the zoned logical unit as follows (e.g., 1.1, 1.2, 1.4, 2.1, 2.3, 3.1, 1.7, 2.2, 3.2, 1.5, 2.4, 1.6, 1.3, 3.3, which may be represented in accordance with the format {zone.LBA}). In this example, the third command for zone 1 may address LBA4 before the command for zone 1 addressing LBA3 (e.g., the sixth command received for zone 1) is processed by the zoned logical unit. Thus, the third command may be rejected. In some examples, the host may resend the third command before the in-order command for zone 1 (1.3) is processed by the zoned logical unit, and the memory system may again reject the command. Similarly, the fourth command for zone 1 (1.7) the fifth command for zone 1 (1.5), and the sixth command for zone 1 (1.6) may be rejected one or more times before the in-order command for zone 1 (1.3) is processed by the zoned logical unit. The additional latency added by the memory system sending check condition status rejections and the host system resending rejected commands may excessively reduce the performance of the zoned logical unit.

Thus, to prevent the above scenario from occurring, a host system may be configured to maintain a single command per zone in the command queue. Accordingly, commands may be prevented from being loaded into the command queue in a different order than received from the host system. In such cases, if the host system issues a command including a starting LBA that is mismatched with the first free LBA indicated by the write pointer, the memory system may reject the command (e.g., for loading into the command queue) and send a check condition status (e.g., indicating an address of the first free LBA) to the host system. Based on receiving the check condition status, the host system may send the correct, skipped command addressing the first free LBA, resend the command to the memory system after modifying the command to indicate the address of the first free LBA, or the like.

Though improving performance relative to the example scenario above, limiting a host system to including only one command per zone in a command queue may also reduce performance relative to implementations that allow more than one command per zone to be loaded into the command queue (e.g., so long as out-of-order errors do not occur). Thus, mechanisms (e.g., methods, systems, apparatuses, techniques, configurations, components) that support loading multiple commands per zone into the command queue and improved management of the reception of out-of-order commands may be desired.

To support loading multiple commands per zone into the command queue and improved management of the reception of out-of-order commands, a host system may be permitted to include more than one command per zone in a command queue and out-of-order commands that are received for a zone may be temporarily held (e.g., for a threshold duration) while the host system continues to load the command queue with additional commands (e.g., including the in-order command). If the in-order commands are received within the threshold duration, the in-order commands and the out-of-order commands may then be executed sequentially without any check condition statuses being sent to the host system.

In some examples, the memory system 210 (e.g., via the memory system controller 215) loads, into a queue (e.g., the command queue 260) commands for accessing one or more zones of multiple zones of a memory space (e.g., a logical unit). In some examples, for a first zone of the one or more zones, first commands of the commands are loaded into the queue. Based on loading the first commands into the queue, the memory system 210 (e.g., via the memory system controller 215) may delay an execution of a first command of the first commands based on an address (e.g., a logical block address) of the first command being different than a current reference address of a pointer for the first zone—the pointer may indicate a first free address in the zone. In some examples, as part of delaying the execution of the first command, the memory system (e.g., via the memory system controller 215) may temporarily store the first command in another queue (e.g., the buffer queue 265 or the temporary queue 280).

Based on delaying the execution of the first command, the memory system 210 may retrieve a subsequent second command from the queue. The memory system 210 (e.g., via the memory system controller 215) may then execute the second command of the first commands based on the second command being loaded into the queue within a threshold duration of delaying the execution of the first command and on an address of the second command matching the current reference address of the pointer. Based on executing the second command, the memory system 210 (e.g., via the memory system controller 215) may subsequently execute the first command based on the address of the first command now matching the current reference address of the pointer as a result of the second command being executed.

By allowing multiple commands to be loaded into a queue per zone and delaying an execution of out-of-order commands until an in-order command is received (or a threshold duration expires, whichever is first), a host system may load a command queue for a zoned logical unit with reduced latency, a latency associated with handling out-of-order commands may be significantly reduced, and a quantity of failed commands (that are then retransmitted) may be significantly reduced. Accordingly, a latency of a memory system may be decreased, and a throughput of a memory system may be increased.

Figure 3:
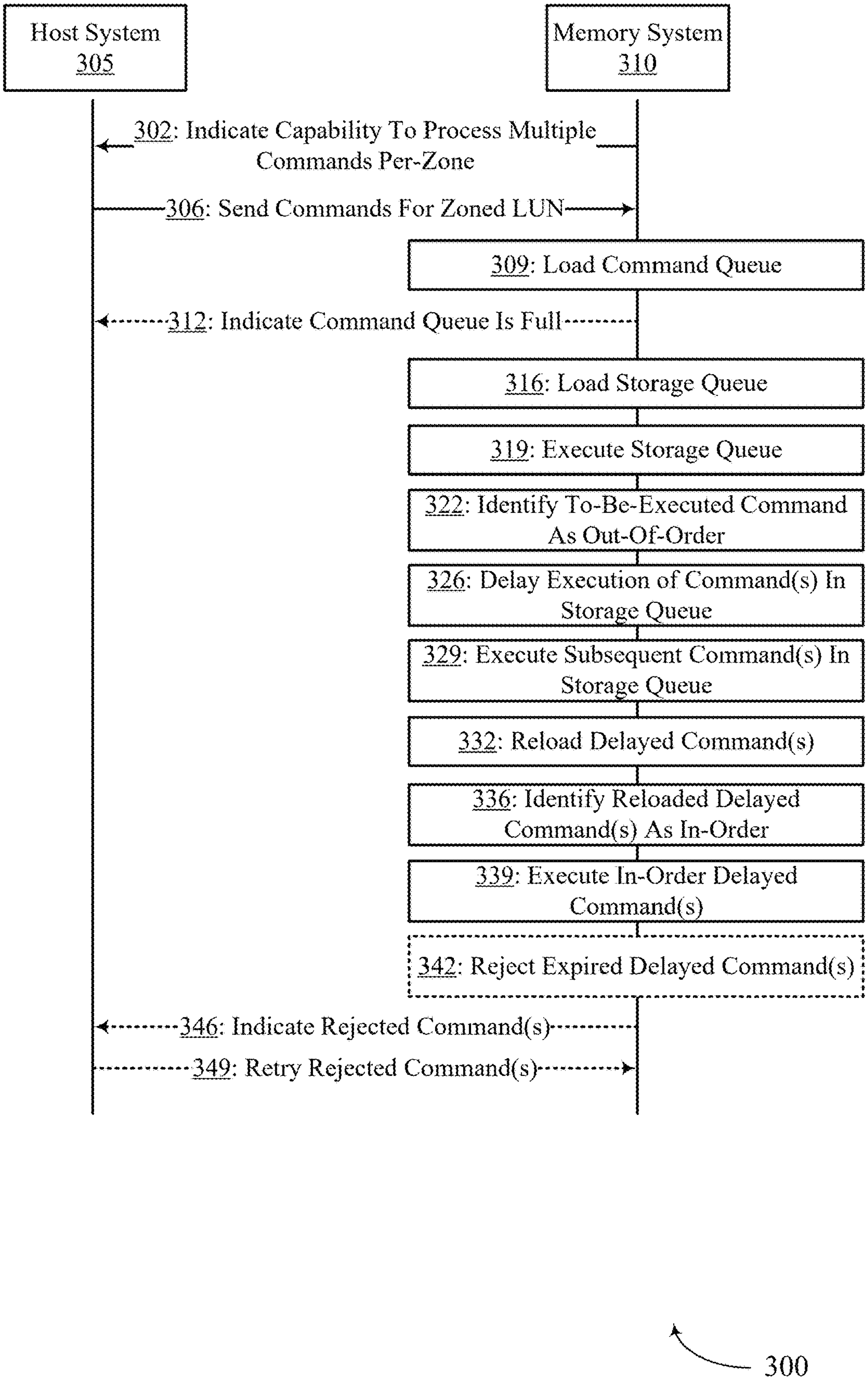
FIG. 3 shows an example of a set of operations for out-of-order per-zone command handling for zoned memory in accordance with examples as disclosed herein.

FIG. 3 shows an example of a set of operations for out-of-order per-zone command handling for zoned memory in accordance with examples as disclosed herein.

The process flow 300 may be performed by the host system 305 and a memory system 310, which may be respective examples of a host system (e.g., host system 105 of FIG. 1 and host system 205 of FIG. 2) and a memory system (e.g., memory system 110 of FIG. 1 and memory system 210 of FIG. 2) described herein. In some examples, the process flow 300 shows an example set of operations performed to support out-of-order per-zone command handling for zoned memory. For example, the process flow 300 may include operations for delaying the execution of out-of-order commands received for a zone in a zoned logical unit until in-order commands for the zone are executed.

At 302, a capability to process multiple commands (e.g., read commands, write commands) per zone for one or more zoned logical units may be indicated, for example, to the host system 305. In some examples, the capability may be indicated in a UPIU.

At 306, commands for the one or more zoned logical units may be sent, for example, to the memory system. In some examples, a set of commands may include one or more first commands for a first zone of a zoned logical unit, one or more second commands for a second zone of the zoned logical unit, and one or more third commands for a third zone of the zoned logical unit. In some cases, the first commands may include multiple commands for the first zone. In some examples, the first commands may be issued at the host system 305, sent to the memory system 310, and/or processed at the memory system 310 in a different order than desired by the host system 305—e.g., adjacent commands of the first commands may address non-adjacent logical block addresses. In some examples, the host system 305 may continue to send commands to the memory system 310 until an indication is received from the memory system 310 that the command queue at the memory system is full.

At 309, a command queue (e.g., as similarly described with reference to command queue 260), for example, at the memory system 310 may be loaded with the commands received, for example, from the host system 305. In some examples, the command queue includes multiple sub-queues corresponding to the zones of the zoned logical unit. In some examples, the commands may be loaded into respective sub-queues in accordance with the zones addressed by the respective commands. In some examples, multiple commands for a first zone may be loaded into the command queue (e.g., into a first sub-queue). Additionally, or alternatively, multiple commands for a second zone may be loaded into the command queue (e.g., into a second sub-queue. Additionally, or alternatively, one or more commands for a third zone may be loaded into the command queue (e.g., into a third sub-queue). And so on.

At 312, an indication that the command queue at, for example, the memory system 310 is full may be indicated, for example, to the host system 305. In some examples, the indication may indicate that a sub-queue of the command queue (designated for a zone of the zoned logical unit) is full.

At 316, a storage queue (e.g., as similarly described with reference to storage queue 270), for example, at the memory system 310 may be loaded with commands stored in the command queue. In some examples, the commands may be loaded into the storage queue in a same order as the commands were loaded into the command queue. In some examples, the storage queue includes multiple sub-queues corresponding to the zones of the zoned logical unit. In some examples, the memory system 310 implements a pointer for each zone of the zoned logical unit, where a respective pointer for a respective zone is configured to indicate the first free address (e.g., LBA) in the zone.

At 319, the commands in the storage queue may be executed, for example, at the memory system 310. In some examples, different commands for accessing different zones may be executed in parallel. In some examples, before executing a command for accessing a zone in the zoned logical unit, a determination of whether the command to be executed references an address that matches the first free address for the zone may be made. If the address matches the first free address (as indicated by the corresponding pointer), then the command for accessing the zone may be executed. In some examples, in response to a command having an address that matches the first free address, access operations for multiple sequential logical block addresses indicated by the command may be executed, starting with the address of the command. Otherwise, if the address is different than the first free address (as indicated by the corresponding pointer), then execution of the command for accessing the zone may be delayed. In some examples, a current reference address indicated by the pointer for a zone is updated after each command is executed (e.g., to match the first free address after the command is executed).

At 322, a to-be-executed command in the storage queue may be identified as being out-of-order. In some examples, the to-be-executed command is identified as being out-of-order based on the command including an address for a zone that is different the current reference address for the zone stored by the corresponding pointer.

At 326, an execution of the out-of-order command may be delayed. In some examples, delaying the execution of the out-of-order command includes loading the out-of-order command back into the storage queue to be executed at a later time. In some examples, delaying the execution of the out-of-order command includes storing the out-of-order command in another location (e.g., a queue for temporarily holding commands) of the memory system 310. In some examples, the location may be implemented in hardware and may be configured to set a timeout for out-of-order commands stored in the location such that an out-of-order command is transferred back to the storage queue at an end of a respective timeout duration. In some examples, the delayed out-of-order commands may be reordered based on their respective addresses—e.g., so that, relative to one another, the delayed out-of-order commands are in order.

In some examples, the execution of the out-of-order command may be delayed for a threshold duration, after which if an out-of-order command (e.g., a first of the out-of-order commands) does not become in-order, the command may be rejected by the memory system 310. By contrast, if a memory system only allows one command per-zone, such a memory system may reject the out-of-order command immediately.

At 329, one or more commands that are received, for example, at the memory system 310 subsequent to the out-of-order command may be executed, for example, at the memory system 310. In some examples, the subsequent command(s) are for the zone and are executed based on having respective addresses that match the current reference address of the corresponding pointer. In some examples, a current reference address indicated by the pointer for a zone is updated after each command is executed (e.g., to match the first free address after the command is executed).

At 332, one or more delayed out-of-order commands may be reloaded into the storage queue for execution. In some examples, the delayed out-of-order command(s) are reloaded based on identifying that a command having an address that precedes and is adjacent to the address of a delayed out-of-order command has been executed at the memory system 310. In some examples, the delayed out-of-order commands are reloaded based on having been delayed for a duration—e.g., that is less than or equal to the threshold duration.

At 336, the reloaded delayed out-of-order command(s) may be identified as being in-order—e.g., based on executing the subsequent in-order command(s), as described with reference to 329. In some examples, identifying the delayed out-of-order command(s) includes determining that an address of the delayed out-of-order command(s) are for a zone and that the respective addresses of the delayed out-of-order command(s) matches current reference address(es) of a corresponding pointer, respectively. In some examples, a reloaded out-of-order command may be identified as remaining out-of-order. In such cases, the execution of the reloaded out-of-order command may be again delayed (e.g., if the delayed out-of-order command has been delayed for less than a threshold duration) or rejected (e.g., if the delayed out-of-order command has been delayed for at least the threshold duration).

At 339, the reloaded delayed out-of-order commands may be executed—e.g., based on being identified as being in-order.

At 342, one or more delayed out-of-order commands may be rejected by, for example, the memory system 310—e.g., based on an execution of the one or more delayed out-of-order commands being delayed for at least the threshold duration. In some examples, the delayed out-of-order commands may be rejected based on being delayed (e.g., moved to the queue for temporarily storing out-of-order commands) a threshold quantity of times.

At 346, an indication that the one or more delayed out-of-order commands have been rejected may be sent, for example, to the host system 305.

At 349, the one or more delayed out-of-order commands may be again sent to, for example, the memory system 310 for execution. In such cases, if the one or more retried out-of-order commands are now in-order, then the retried out-of-order commands may be executed at the memory system 310. Otherwise, if one or more of the retried out-of-order command(s) remain out-of-order, then execution of the one or more retried out-of-order command(s) may again be delayed, as described with reference to 326.

Aspects of the process flow 300 may be implemented by respective controllers at the respective devices. Additionally, or alternatively, aspects of the process flow 300 may be implemented as instructions stored in memory (e.g., firmware stored in a memory coupled with a controller) at the respective devices. For example, the instructions, when executed by a controller at one of the respective devices, may cause the controller to perform the operations of the process flow 300 performed by that device. Similarly, the instructions, when executed by a controller at the other of the respective devices, may cause the controller to perform the operations of the process flow 300 performed by that device.

One or more of the operations described in the process flow 300 may be performed earlier or later, omitted, replaced, supplemented, or combined with another operation. Also, additional operations described herein may replace, supplement or be combined with one or more of the operations described in the process flow 300.

Figure 4:
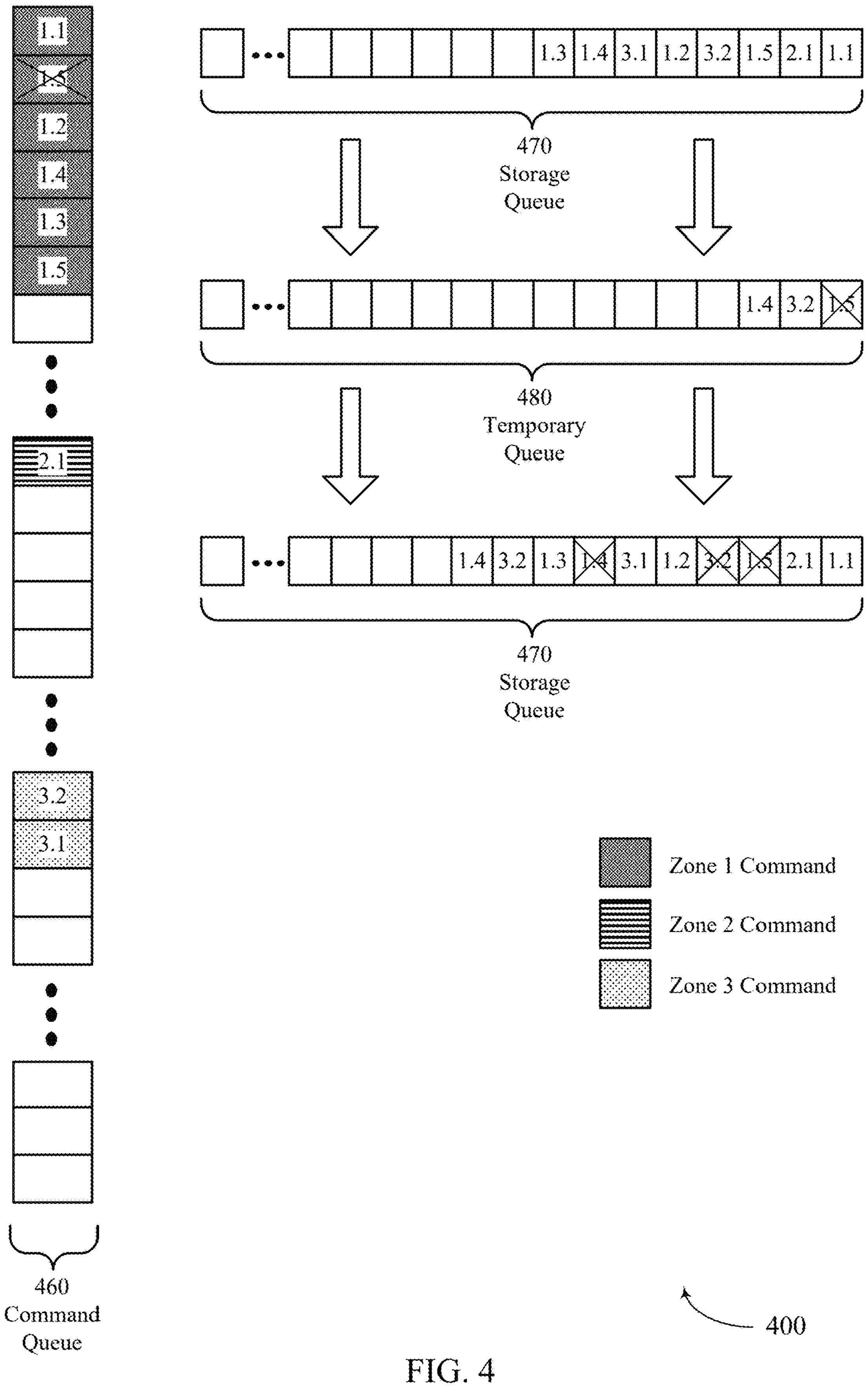
FIG. 4 shows example queue operations for out-of-order per-zone command handling for zoned memory in accordance with examples as disclosed herein.

FIG. 4 shows example queue operations for out-of-order per-zone command handling for zoned memory in accordance with examples as disclosed herein.

The queue operation 400 depicts a command flow through the command queue 460, the storage queue 470, and a temporary queue 480 of a memory system. In some examples, the command queue 460 and the storage queue 470 may be respective example of a command queue (e.g., the command queue 260 of FIG. 2) and a storage queue (e.g., the storage queue 270 of FIG. 2) described herein. In some examples, the commands in the command queue 460 may be retrieved in a top-to-bottom order. In other examples, the command in the command queue 460 may be retrieved in any order desired by a memory system. In some examples, commands in the storage queue 470 may be executed in a right-to-left order.

In some examples, the command queue 460 may be partitioned into multiple sub-queues that are allocated to respective zones of the memory space. For example, the command queue 460 may include a first sub-queue having a first quantity of spaces for a first zone of a zoned memory space, a second sub-queue having a second quantity of spaces for a second zone of the zoned memory space, and so on. In some examples, the sub-queues each have a same size. In other examples, the sub-queues may have different sizes. Additionally, or alternatively, the storage queue 470 may similarly be partitioned into multiple sub-queues that are allocated to respective zones of the memory space. In some examples, the commands in the sub-queues of the command queue 460 may be retrieved in a top-to-bottom order. In other examples, the command in the sub-queues of the command queue 460 may be retrieved in any order desired by a memory system.

In some examples, a host system may load the command queue 460 with commands for accessing data stored in a zone memory space at a memory system. As described herein, the commands may include first command(s) (e.g., zone 1 commands) directed to a first zone of a memory space, second command(s) (e.g., zone 2 commands) directed to a second zone of the memory space, and third command(s) (e.g., zone 3 commands) directed to a third zone of the memory space.

As described herein, in some examples, a memory system may receive multiple commands for one or more zones of a zoned memory space. For example, the memory system may receive multiple commands (1.1-1.5, which may be represented in accordance with the format {zone.LBA}) for the first zone, one command (2.1) for the second zone, and multiple commands (3.1 and 3.2) for the third zone. As further described herein, in some examples, the multiple commands received for a zone may be received out-of-order, such that the LBAs addressed by the commands (arranged in the order they were received) are non-sequential. For example, after the first command (1.1) received for the first free LBA of the first zone is received, the subsequent command (1.5) received for the first zone may address the fifth LBA (LBA_5), and the following command (1.2) received for the first zone may address the second LBA (LBA_2).

As described herein, instead of, for example, immediately rejecting out-of-order commands that are received from a host system, the memory system may implement techniques for temporarily accepting out-of-order commands—e.g., by identifying and delaying execution of out-of-order commands. In some examples, the commands in the command queue 460 may be loaded into the storage queue 470 for execution—e.g., in the same order the commands are received at the memory system, in the same order the commands are loaded into the command queue 460, etc.

Based on loading the storage queue 470, the memory system may execute the commands in the storage queue 470. In some examples, based on executing the commands in the storage queue 470, one or more commands due for execution may be identified as being out-of-order (e.g., 1.5, 3.2, and 1.4)—e.g., based on determining that an address of the commands does not match the current reference address indicated by pointer for a corresponding zone. In some examples, the out-of-order commands may be temporarily stored in the temporary queue 480, which may be implemented in firmware, hardware, or a combination thereof. In some examples, out-of-order commands may be temporarily stored for a threshold duration, such that out-of-order commands stored in the temporary queue 480 longer than the threshold duration may be rejected by the memory system—e.g., command 1.5 may be rejected after being stored in the temporary queue 480 for longer than the threshold duration. The memory system may indicate to the host system those commands that are rejected, and the host system may reissue such commands for storage in the command queue 460. In some examples, rather than loading all of the commands into the storage queue 470, the memory system may be configured to load out-of-order commands directly into the temporary queue 480. In some examples, the commands stored in the temporary queue 480 may be reordered (e.g., periodically) so that, within the temporary queue 480, the otherwise out-of-order commands may be in-order relative to one another.

In some examples, the memory system may continue to execute commands in the storage queue 470 in parallel with loading out-of-order commands into the temporary queue 471. In some examples, based on continuing to execute the commands, one or more of the out-of-order commands (e.g., 3.2 and 1.4) may become in-order. In such cases, the previously out-of-order commands may be reloaded into the storage queue 470 for in-order (e.g., sequential) execution. In some examples, the memory system may monitor the commands stored in the temporary queue 480, and based on the monitoring, may identify when an out-of-order command has become in-order. Based on identifying the out-of-order command has become in-order, the memory system may reload the command into the storage queue 470. In other examples, the memory system may not monitor the commands to identify when an out-of-order command has become in-order. In such cases, the memory system may periodically return out-of-order commands to the storage queue 470 for execution. In some examples, the memory system may keep track of a quantity of times an out-of-order command has been returned to the storage queue 470 and may reject commands that have been returned to the storage queue 470 a threshold quantity of times.

Based on reloading the previously out-of-order commands into the storage queue 470, the memory system may execute the out-of-order commands without involving the host system.

Figure 5:
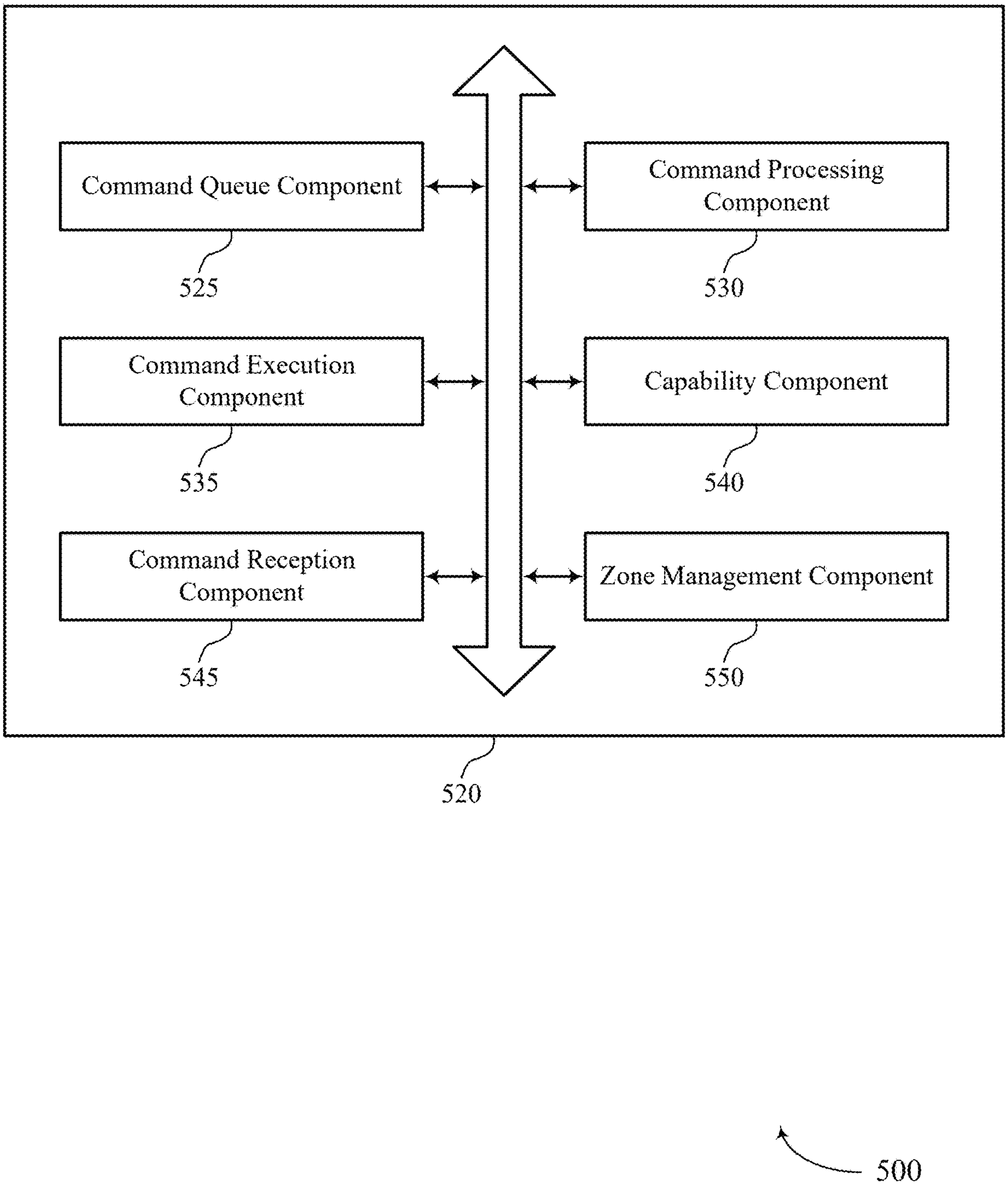
FIG. 5 shows a block diagram of a memory system that supports out-of-order per-zone command handling for zoned memory in accordance with examples as disclosed herein.

FIG. 5 shows a block diagram 500 of a memory system 520 that supports out-of-order per-zone command handling for zoned memory in accordance with examples as disclosed herein. The memory system 520 may be an example of aspects of a memory system as described with reference to FIGS. 1 through 4. The memory system 520, or various components thereof, may be an example of means for performing various aspects of out-of-order per-zone command handling for zoned memory as described herein. For example, the memory system 520 may include a command queue component 525, a command processing component 530, a command execution component 535, a capability component 540, a command reception component 545, a zone management component 550, or any combination thereof. Each of these components, or components of subcomponents thereof (e.g., one or more processors, one or more memories), may communicate, directly or indirectly, with one another (e.g., via one or more buses).

The command queue component 525 may be configured as or otherwise support a means for loading, into a queue, commands for one or more zones of a plurality of zones of a memory space. The command processing component 530 may be configured as or otherwise support a means for delaying, in accordance with loading the commands into the queue, an execution of a first command of a first plurality of the commands for a first zone of the one or more zones in accordance with a first address of the first command being different than a current reference address of a pointer for the first zone. The command execution component 535 may be configured as or otherwise support a means for executing, in accordance with delaying the execution of the first command, a second command of the first plurality of the commands in accordance with the second command being loaded into the queue within a threshold duration of delaying the execution of the first command and on a second address of the second command matching the current reference address of the pointer for the first zone, where the second command is received at the memory system after the first command. In some examples, the command execution component 535 may be configured as or otherwise support a means for executing, in accordance with executing the second command, the first command in accordance with the first address matching the current reference address of the pointer for the first zone.

In some examples, the capability component 540 may be configured as or otherwise support a means for indicating, prior to loading the commands into the queue, to a host system, a capability of processing multiple commands for a single zone of the plurality of zones. In some examples, the command reception component 545 may be configured as or otherwise support a means for receiving, prior to loading the commands into the queue, from the host system, the commands for the one or more zones of the plurality of zones.

In some examples, the command processing component 530 may be configured as or otherwise support a means for retrieving, in accordance with loading the commands into the queue, the first command from the queue. In some examples, the command processing component 530 may be configured as or otherwise support a means for determining, in accordance with retrieving the first command, whether the first address of the first command is different than the current reference address of the pointer for the first zone, where the execution of the first command is delayed in accordance with determining that the first address is different than the current reference address.

In some examples, the command processing component 530 may be configured as or otherwise support a means for storing, for up to the threshold duration, the first command at the memory system for at least a portion of the threshold duration, where the execution of the first command is delayed in accordance with storing the first command.

In some examples, the command execution component 535 may be configured as or otherwise support a means for loading, in accordance with the execution of the second command, the first command back into a second queue, where the first command is executed in accordance with being loaded back into the second queue.

In some examples, the zone management component 550 may be configured as or otherwise support a means for updating, in accordance with the execution of the second command, the current reference address of the pointer of the first zone. In some examples, the command execution component 535 may be configured as or otherwise support a means for determining, in accordance with updating the current reference address, whether the first address of the first command matches the current reference address of the pointer for the first zone, where the first command is executed in accordance with the first address of the first command matching the current reference address of the pointer for the first zone.

In some examples, the command execution component 535 may be configured as or otherwise support a means for loading, into a second queue, a set of commands of the first plurality of the commands including, where the set of commands includes the first command and the second command, where the queue is a command queue, and where the second queue is a storage queue. In some examples, the command execution component 535 may be configured as or otherwise support a means for determining, in accordance with loading the set of commands into the second queue, whether the first address of the first command is different than the current reference address of the pointer of the first zone, where the execution of the first command is delayed in accordance with determining that the first address is different than the current reference address.

In some examples, for the first zone of the one or more zones, the first plurality of the commands is loaded into the queue, and for a second zone of the one or more zones, a second plurality of the commands is loaded into the queue.

In some examples, the command queue component 525 may be configured as or otherwise support a means for sending, in accordance with loading the commands into the queue, to a host system, an indication that the queue is full.

In some examples, the command execution component 535 may be configured as or otherwise support a means for delaying, in accordance with loading the commands into the queue, an execution of a third command of the first plurality of the commands in accordance with a third address associated with the third command being different than the current reference address of the pointer for the first zone, where the third command is loaded into the queue prior to the first command. In some examples, the command execution component 535 may be configured as or otherwise support a means for sending, in accordance with delaying the execution of the third command, to a host system, a rejection of the third command in accordance with the execution of the third command being delayed for longer than the threshold duration.

In some examples, the command reception component 545 may be configured as or otherwise support a means for receiving, in response to sending the rejection of the third command, a retransmission of the third command from the host system.

In some examples, the described functionality of the memory system 520, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 520, or various components thereof, may be implemented at least in part by instructions (e.g., stored in memory, non-transitory computer-readable medium) executable by such at least one processor.

Figure 6:
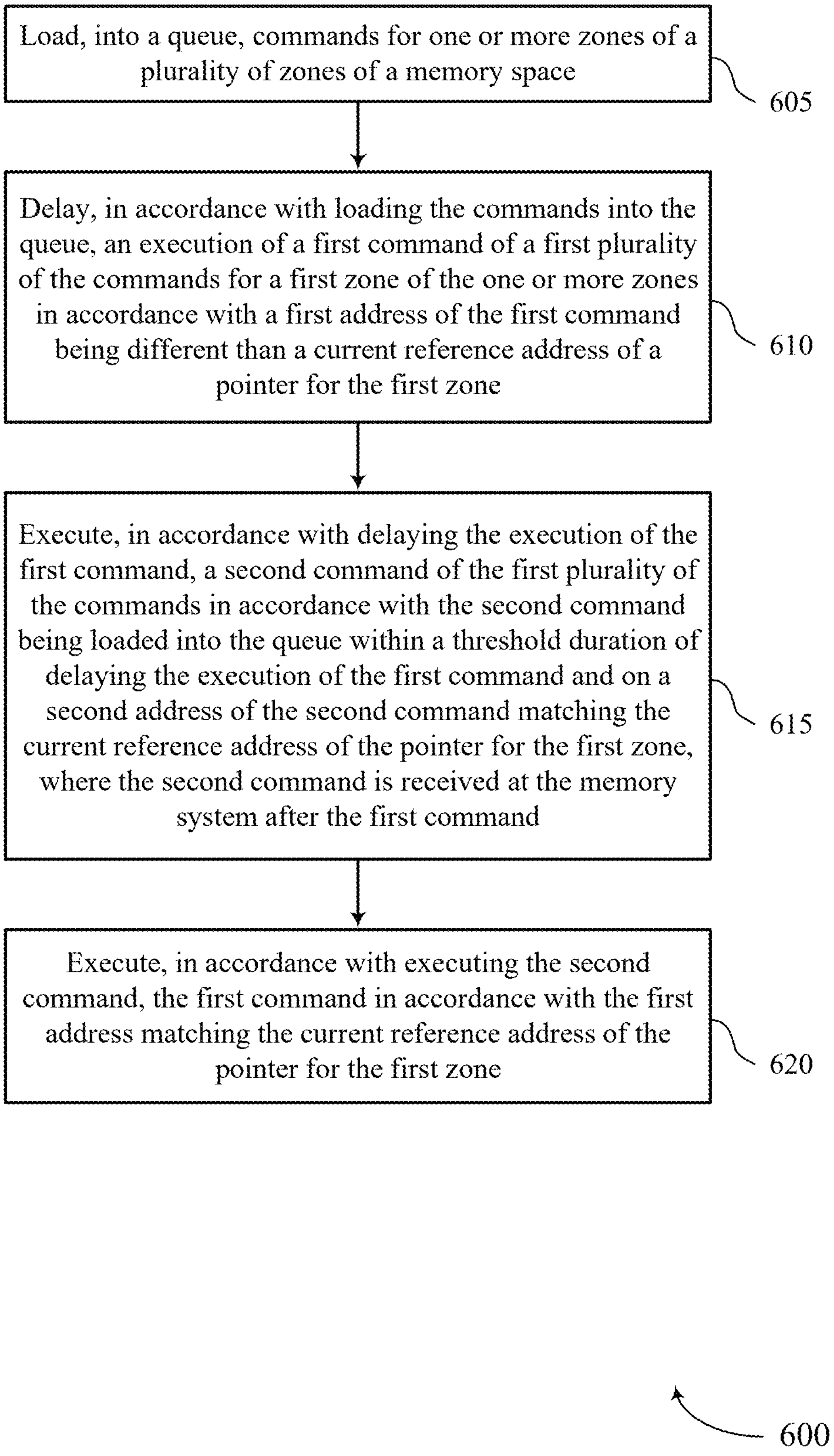
FIG. 6 shows a flowchart illustrating a method or methods that support out-of-order per-zone command handling for zoned memory in accordance with examples as disclosed herein.

FIG. 6 shows a flowchart illustrating a method 600 that supports out-of-order per-zone command handling for zoned memory in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally, or alternatively, the memory system may perform aspects of the described functions using special-purpose hardware.

At 605, the method may include loading, into a queue, commands for one or more zones of a plurality of zones of a memory space. In some examples, aspects of the operations of 605 may be performed by a command queue component 525 as described with reference to FIG. 5.

At 610, the method may include delaying, in accordance with loading the commands into the queue, an execution of a first command of a first plurality of the commands for a first zone of the one or more zones in accordance with a first address of the first command being different than a current reference address of a pointer for the first zone. In some examples, aspects of the operations of 610 may be performed by a command processing component 530 as described with reference to FIG. 5.

At 615, the method may include executing, in accordance with delaying the execution of the first command, a second command of the first plurality of the commands in accordance with the second command being loaded into the queue within a threshold duration of delaying the execution of the first command and on a second address of the second command matching the current reference address of the pointer for the first zone, where the second command is received at the memory system after the first command. In some examples, aspects of the operations of 615 may be performed by a command execution component 535 as described with reference to FIG. 5.

At 620, the method may include executing, in accordance with executing the second command, the first command in accordance with the first address matching the current reference address of the pointer for the first zone. In some examples, aspects of the operations of 620 may be performed by a command execution component 535 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for loading, into a queue, commands for one or more zones of a plurality of zones of a memory space; delaying, in accordance with loading the commands into the queue, an execution of a first command of a first plurality of the commands for a first zone of the one or more zones in accordance with a first address of the first command being different than a current reference address of a pointer for the first zone; executing, in accordance with delaying the execution of the first command, a second command of the first plurality of the commands in accordance with the second command being loaded into the queue within a threshold duration of delaying the execution of the first command and on a second address of the second command matching the current reference address of the pointer for the first zone, where the second command is received at the memory system after the first command; and executing, in accordance with executing the second command, the first command in accordance with the first address matching the current reference address of the pointer for the first zone.

Aspect 2: The method, apparatus, or non-transitory computer-readable medium of aspect 1, further including operations, features, circuitry, logic, means, or instructions, or any combination thereof for indicating, prior to loading the commands into the queue, to a host system, a capability of processing multiple commands for a single zone of the plurality of zones and receiving, prior to loading the commands into the queue, from the host system, the commands for the one or more zones of the plurality of zones.

Aspect 3: The method, apparatus, or non-transitory computer-readable medium of any of aspects 1 through 2, further including operations, features, circuitry, logic, means, or instructions, or any combination thereof for retrieving, in accordance with loading the commands into the queue, the first command from the queue and determining, in accordance with retrieving the first command, whether the first address of the first command is different than the current reference address of the pointer for the first zone, where the execution of the first command is delayed in accordance with determining that the first address is different than the current reference address.

Aspect 4: The method, apparatus, or non-transitory computer-readable medium of any of aspects 1 through 3, further including operations, features, circuitry, logic, means, or instructions, or any combination thereof for storing, for up to the threshold duration, the first command at the memory system for at least a portion of the threshold duration, where the execution of the first command is delayed in accordance with storing the first command.

Aspect 5: The method, apparatus, or non-transitory computer-readable medium of any of aspects 1 through 4, further including operations, features, circuitry, logic, means, or instructions, or any combination thereof for loading, in accordance with the execution of the second command, the first command back into a second queue, where the first command is executed in accordance with being loaded back into the second queue.

Aspect 6: The method, apparatus, or non-transitory computer-readable medium of any of aspects 1 through 5, further including operations, features, circuitry, logic, means, or instructions, or any combination thereof for updating, in accordance with the execution of the second command, the current reference address of the pointer of the first zone and determining, in accordance with updating the current reference address, whether the first address of the first command matches the current reference address of the pointer for the first zone, where the first command is executed in accordance with the first address of the first command matching the current reference address of the pointer for the first zone.

Aspect 7: The method, apparatus, or non-transitory computer-readable medium of any of aspects 1 through 6, further including operations, features, circuitry, logic, means, or instructions, or any combination thereof for loading, into a second queue, a set of commands of the first plurality of the commands including, where the set of commands includes the first command and the second command, where the queue is a command queue, and where the second queue is a storage queue and determining, in accordance with loading the set of commands into the second queue, whether the first address of the first command is different than the current reference address of the pointer of the first zone, where the execution of the first command is delayed in accordance with determining that the first address is different than the current reference address.

Aspect 8: The method, apparatus, or non-transitory computer-readable medium of any of aspects 1 through 7, where for the first zone of the one or more zones, the first plurality of the commands is loaded into the queue, and for a second zone of the one or more zones, a second plurality of the commands is loaded into the queue.

Aspect 9: The method, apparatus, or non-transitory computer-readable medium of any of aspects 1 through 8, further including operations, features, circuitry, logic, means, or instructions, or any combination thereof for sending, in accordance with loading the commands into the queue, to a host system, an indication that the queue is full.

Aspect 10: The method, apparatus, or non-transitory computer-readable medium of any of aspects 1 through 9, further including operations, features, circuitry, logic, means, or instructions, or any combination thereof for delaying, in accordance with loading the commands into the queue, an execution of a third command of the first plurality of the commands in accordance with a third address associated with the third command being different than the current reference address of the pointer for the first zone, where the third command is loaded into the queue prior to the first command and sending, in accordance with delaying the execution of the third command, to a host system, a rejection of the third command in accordance with the execution of the third command being delayed for longer than the threshold duration.

Aspect 11: The method, apparatus, or non-transitory computer-readable medium of aspect 10, further including operations, features, circuitry, logic, means, or instructions, or any combination thereof for receiving, in response to sending the rejection of the third command, a retransmission of the third command from the host system.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and a second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry, processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:

one or more memory devices; and processing circuitry coupled with the one or more memory devices and configured to cause the memory system to:

load, into a queue, commands for one or more zones of a plurality of zones of a memory space;

delay, in accordance with loading the commands into the queue, an execution of a first command of a first plurality of the commands for a first zone of the one or more zones in accordance with a first address of the first command being different than a current reference address of a pointer for the first zone;

execute, in accordance with delaying the execution of the first command, a second command of the first plurality of the commands in accordance with the second command being loaded into the queue within a threshold duration of delaying the execution of the first command and on a second address of the second command matching the current reference address of the pointer for the first zone, wherein the second command is received at the memory system after the first command; and execute, in accordance with executing the second command, the first command in accordance with the first address matching the current reference address of the pointer for the first zone.

2. The memory system of claim 1, wherein the processing circuitry is further configured to cause the memory system to:

indicate, prior to loading the commands into the queue, to a host system, a capability of processing multiple commands for a single zone of the plurality of zones; and receive, prior to loading the commands into the queue, from the host system, the commands for the one or more zones of the plurality of zones.

3. The memory system of claim 1, wherein the processing circuitry is further configured to cause the memory system to:

retrieve, in accordance with loading the commands into the queue, the first command from the queue; and determine, in accordance with retrieving the first command, whether the first address of the first command is different than the current reference address of the pointer for the first zone, wherein the execution of the first command is delayed in accordance with determining that the first address is different than the current reference address.

4. The memory system of claim 1, wherein, to delay the execution of the first command, the processing circuitry is further configured to cause the memory system to:

store, for up to the threshold duration, the first command at the memory system for at least a portion of the threshold duration.

5. The memory system of claim 1, wherein the processing circuitry is further configured to cause the memory system to:

load, in accordance with the execution of the second command, the first command back into a second queue, wherein the first command is executed in accordance with being loaded back into the second queue.

6. The memory system of claim 1, wherein the processing circuitry is further configured to cause the memory system to:

update, in accordance with the execution of the second command, the current reference address of the pointer of the first zone; and determine, in accordance with updating the current reference address, whether the first address of the first command matches the current reference address of the pointer for the first zone, wherein the first command is executed in accordance with the first address of the first command matching the current reference address of the pointer for the first zone.

7. The memory system of claim 1, wherein the processing circuitry is further configured to cause the memory system to:

load, into a second queue, a set of commands of the first plurality of the commands comprising, wherein the set of commands comprises the first command and the second command, wherein the queue is a command queue, and wherein the second queue is a storage queue; and determine, in accordance with loading the set of commands into the second queue, whether the first address of the first command is different than the current reference address of the pointer of the first zone, wherein the execution of the first command is delayed in accordance with determining that the first address is different than the current reference address.

8. The memory system of claim 1, wherein:

for the first zone of the one or more zones, the first plurality of the commands is loaded into the queue, and for a second zone of the one or more zones, a second plurality of the commands is loaded into the queue.

9. The memory system of claim 1, wherein the processing circuitry is further configured to cause the memory system to:

send, in accordance with loading the commands into the queue, to a host system, an indication that the queue is full.

10. The memory system of claim 1, wherein the processing circuitry is further configured to cause the memory system to:

delay, in accordance with loading the commands into the queue, an execution of a third command of the first plurality of the commands in accordance with a third address associated with the third command being different than the current reference address of the pointer for the first zone, wherein the third command is loaded into the queue prior to the first command; and send, in accordance with delaying the execution of the third command, to a host system, a rejection of the third command in accordance with the execution of the third command being delayed for longer than the threshold duration.

11. The memory system of claim 10, wherein the processing circuitry is further configured to cause the memory system to:

receive, in response to sending the rejection of the third command, a retransmission of the third command from the host system.

12. A non-transitory, computer-readable medium storing code that comprises instructions executable by processing circuitry of a memory system to cause the memory system to:

load, into a queue, commands for one or more zones of a plurality of zones of a memory space;

delay, in accordance with loading the commands into the queue, an execution of a first command of a first plurality of the commands for a first zone of the one or more zones in accordance with a first address of the first command being different than a current reference address of a pointer for the first zone;

execute, in accordance with delaying the execution of the first command, a second command of the first plurality of the commands in accordance with the second command being loaded into the queue within a threshold duration of delaying the execution of the first command and on a second address of the second command matching the current reference address of the pointer for the first zone, wherein the second command is received at the memory system after the first command; and execute, in accordance with executing the second command, the first command in accordance with the first address matching the current reference address of the pointer for the first zone.

13. The non-transitory, computer-readable medium of claim 12, wherein the instructions are further executable by the processing circuitry to cause the memory system to:

indicate, prior to loading the commands into the queue, to a host system, a capability of processing multiple commands for a single zone of the plurality of zones; and receive, prior to loading the commands into the queue, from the host system, the commands for the one or more zones of the plurality of zones.

14. The non-transitory, computer-readable medium of claim 12, wherein the instructions are further executable by the processing circuitry to cause the memory system to:

retrieve, in accordance with loading the commands into the queue, the first command from the queue; and determine, in accordance with retrieving the first command, whether the first address of the first command is different than the current reference address of the pointer for the first zone, wherein the execution of the first command is delayed in accordance with determining that the first address is different than the current reference address.

15. The non-transitory, computer-readable medium of claim 12, wherein, to delay the execution of the first command, the instructions are further executable by the processing circuitry to cause the memory system to:

store, for up to the threshold duration, the first command at the memory system for at least a portion of the threshold duration.

16. The non-transitory, computer-readable medium of claim 12, wherein the instructions are further executable by the processing circuitry to cause the memory system to:

load, in accordance with the execution of the second command, the first command back into a second queue, wherein the first command is executed in accordance with being loaded back into the second queue.

17. The non-transitory, computer-readable medium of claim 12, wherein the instructions are further executable by the processing circuitry to cause the memory system to:

update, in accordance with the execution of the second command, the current reference address of the pointer of the first zone; and determine, in accordance with updating the current reference address, whether the first address of the first command matches the current reference address of the pointer for the first zone, wherein the first command is executed in accordance with the first address of the first command matching the current reference address of the pointer for the first zone.

18. The non-transitory, computer-readable medium of claim 12, wherein the instructions are further executable by the processing circuitry to cause the memory system to:

load, into a second queue, a set of commands of the first plurality of the commands comprising, wherein the set of commands comprises the first command and the second command, wherein the queue is a command queue, and wherein the second queue is a storage queue; and determine, in accordance with loading the set of commands into the second queue, whether the first address of the first command is different than the current reference address of the pointer of the first zone, wherein the execution of the first command is delayed in accordance with determining that the first address is different than the current reference address.

19. The non-transitory, computer-readable medium of claim 12, wherein the instructions are further executable by the processing circuitry to cause the memory system to:

send, in accordance with loading the commands into the queue, to a host system, an indication that the queue is full.

20. The non-transitory, computer-readable medium of claim 12, wherein the instructions are further executable by the processing circuitry to cause the memory system to:

delay, in accordance with loading the commands into the queue, an execution of a third command of the first plurality of the commands in accordance with a third address associated with the third command being different than the current reference address of the pointer for the first zone, wherein the third command is loaded into the queue prior to the first command; and send, in accordance with delaying the execution of the third command, to a host system, a rejection of the third command in accordance with the execution of the third command being delayed for longer than the threshold duration.

21. A method by a memory system, comprising:

loading, into a queue, commands for one or more zones of a plurality of zones of a memory space;

delaying, in accordance with loading the commands into the queue, an execution of a first command of a first plurality of the commands for a first zone of the one or more zones in accordance with a first address of the first command being different than a current reference address of a pointer for the first zone;

executing, in accordance with delaying the execution of the first command, a second command of the first plurality of the commands in accordance with the second command being loaded into the queue within a threshold duration of delaying the execution of the first command and on a second address of the second command matching the current reference address of the pointer for the first zone, wherein the second command is received at the memory system after the first command; and executing, in accordance with executing the second command, the first command in accordance with the first address matching the current reference address of the pointer for the first zone.

22. The method of claim 21, further comprising:

indicating, prior to loading the commands into the queue, to a host system, a capability of processing multiple commands for a single zone of the plurality of zones; and receiving, prior to loading the commands into the queue, from the host system, the commands for the one or more zones of the plurality of zones.

23. The method of claim 21, further comprising:

retrieving, in accordance with loading the commands into the queue, the first command from the queue; and determining, in accordance with retrieving the first command, whether the first address of the first command is different than the current reference address of the pointer for the first zone, wherein the execution of the first command is delayed in accordance with determining that the first address is different than the current reference address.

24. The method of claim 21, wherein delaying the execution of the first command comprises:

storing, for up to the threshold duration, the first command at the memory system for at least a portion of the threshold duration.

25. The method of claim 21, further comprising:

loading, in accordance with the execution of the second command, the first command back into a second queue, wherein the first command is executed in accordance with being loaded back into the second queue.

* * * * *